Sept. 19, 1972   L. M. SCHWARTZ   3,692,488
BACTERIOLOGICAL IDENTIFICATION SYSTEM
Filed Sept. 24, 1970   5 Sheets-Sheet 1

INVENTOR
LAZAR M. SCHWARTZ
BY
*Lilling and Siegel*
ATTORNEYS

Sept. 19, 1972   L. M. SCHWARTZ   3,692,488
BACTERIOLOGICAL IDENTIFICATION SYSTEM
Filed Sept. 24, 1970   5 Sheets-Sheet 2
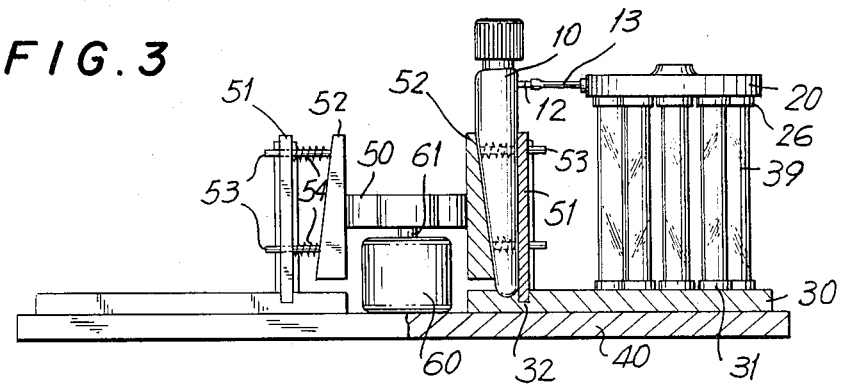
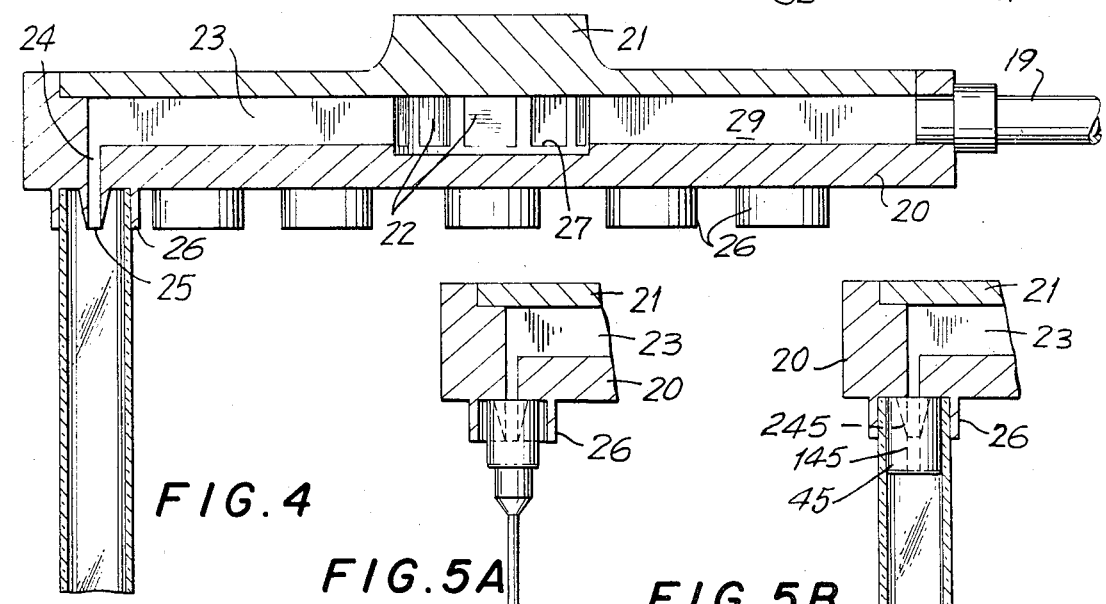
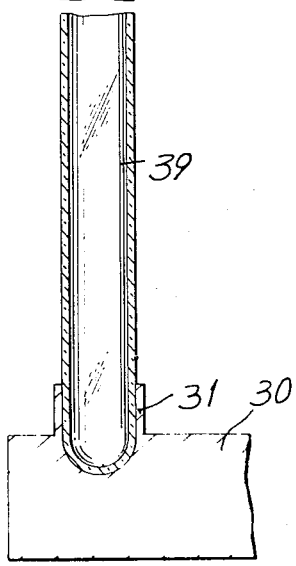
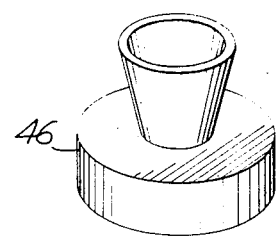
INVENTOR
LAZAR M. SCHWARTZ
BY
*Lilling and Siegel*
ATTORNEYS Sept. 19, 1972  L. M. SCHWARTZ  3,692,488
BACTERIOLOGICAL IDENTIFICATION SYSTEM
Filed Sept. 24, 1970  5 Sheets-Sheet 3
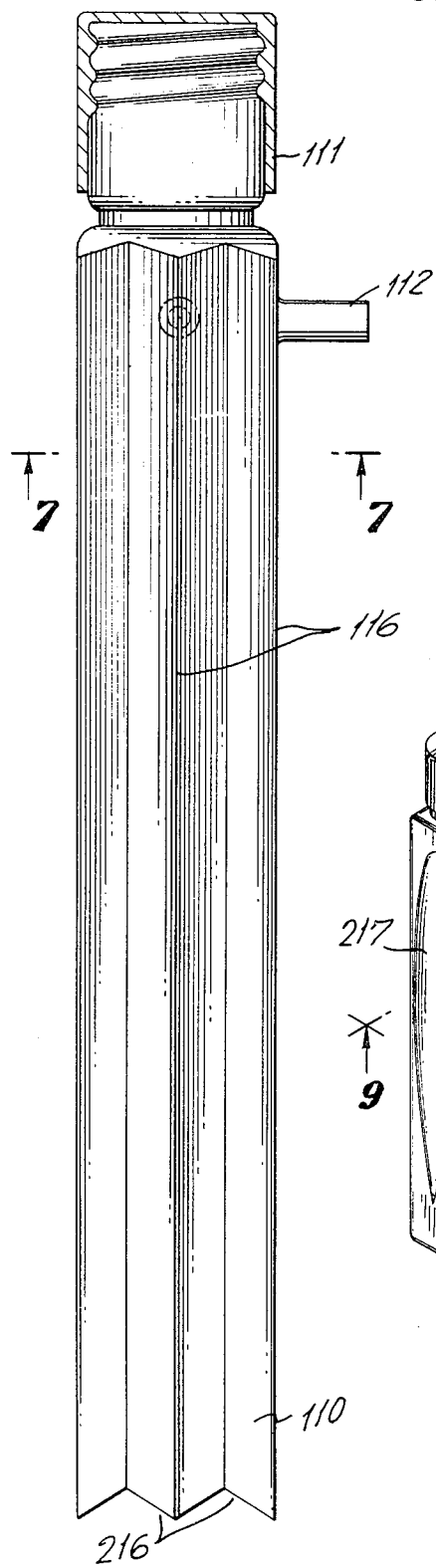
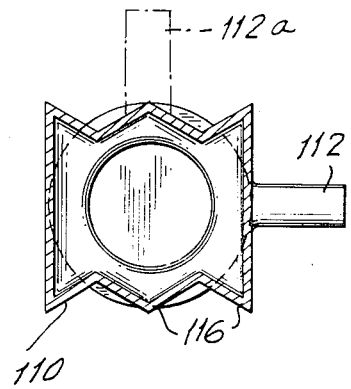
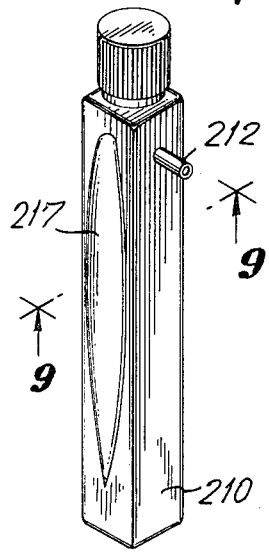
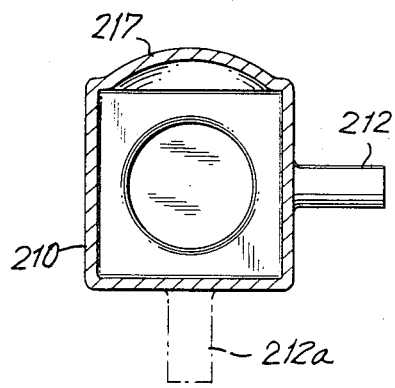
INVENTOR
LAZAR M. SCHWARTZ
BY
Lilling and Siegel
ATTORNEYS Sept. 19, 1972  L. M. SCHWARTZ  3,692,488
BACTERIOLOGICAL IDENTIFICATION SYSTEM
Filed Sept. 24, 1970  5 Sheets-Sheet 4
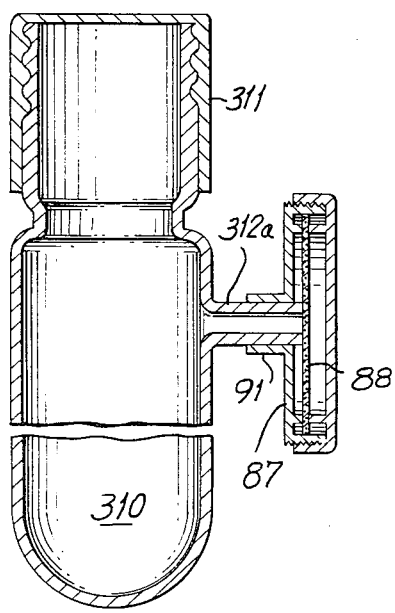
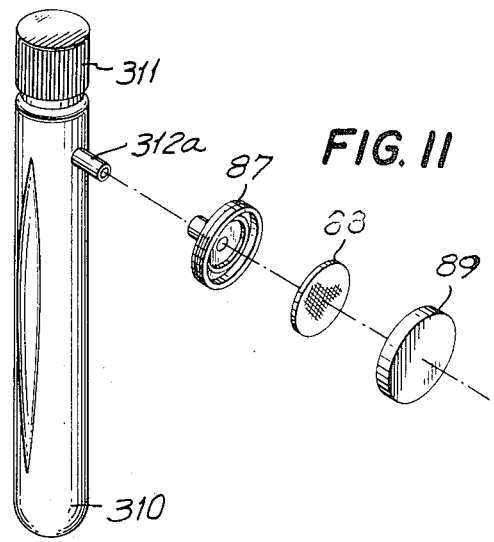
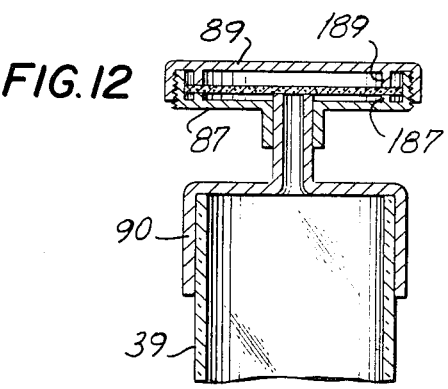
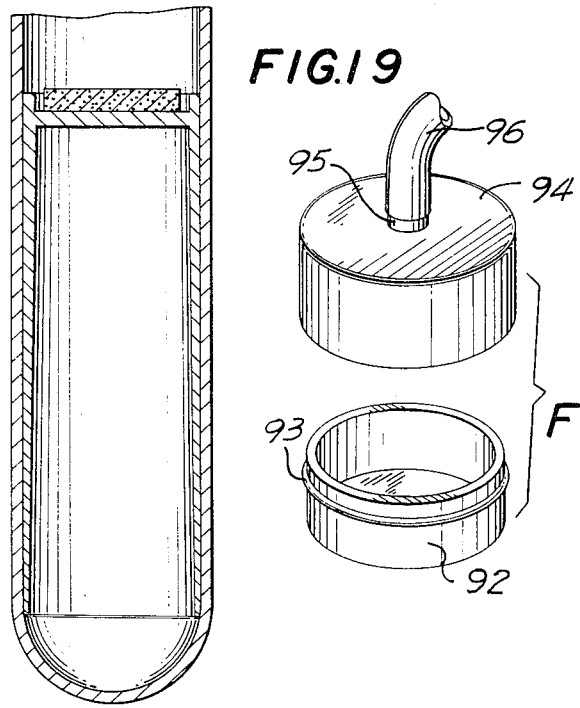
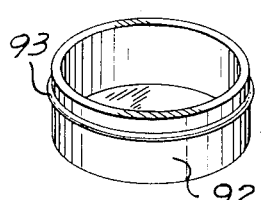
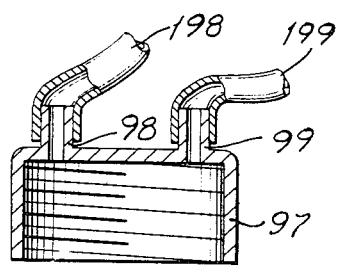
INVENTOR.
LAZAR M. SCHWARTZ
BY
Lilling and Siegel
ATTORNEYS Sept. 19, 1972 L. M. SCHWARTZ 3,692,488
BACTERIOLOGICAL IDENTIFICATION SYSTEM
Filed Sept. 24, 1970 5 Sheets-Sheet 5
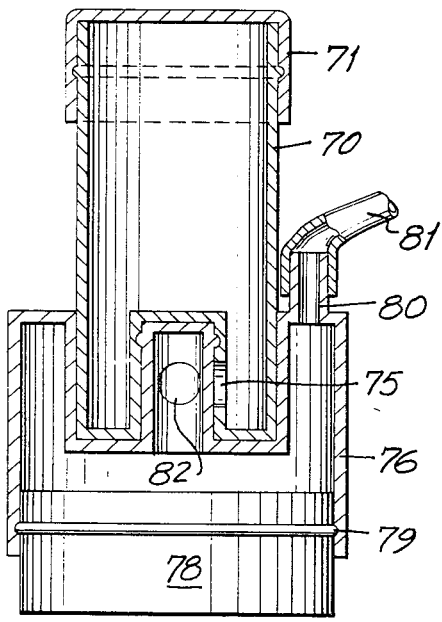
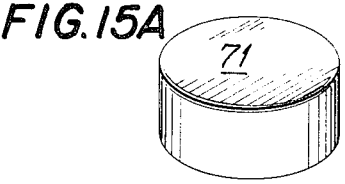
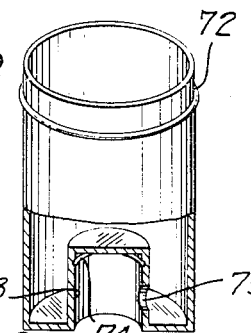
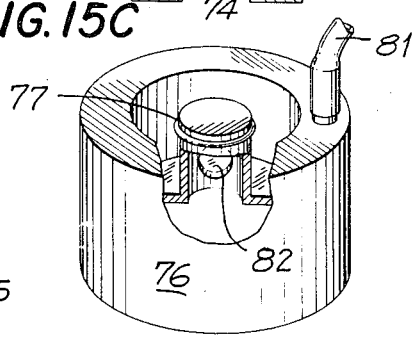
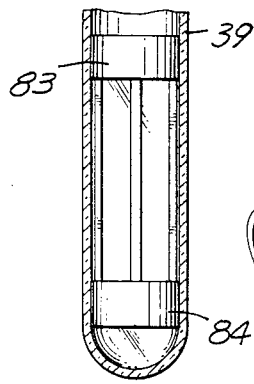
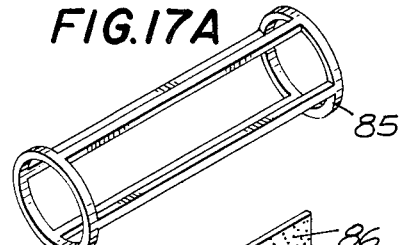
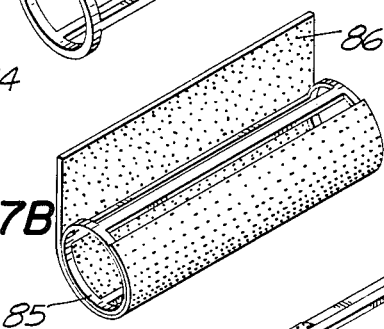
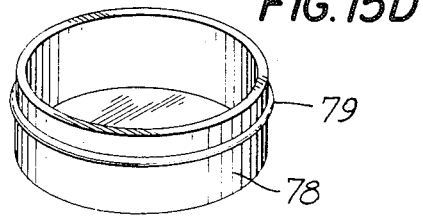
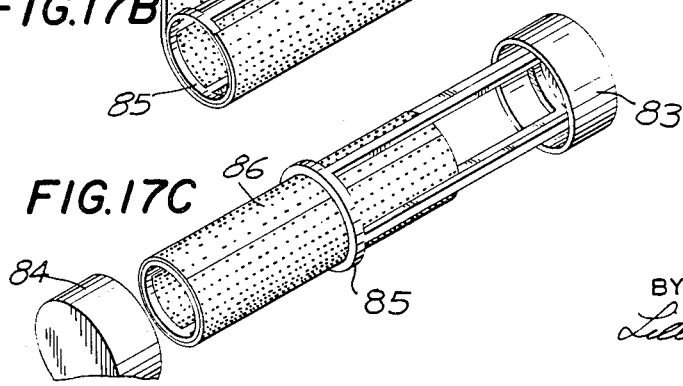
INVENTOR
LAZAR M. SCHWARTZ
BY
Lilling and Siegel
ATTORNEYS _United States Patent Office_

3,692,488
Patented Sept. 19, 1972

3,692,488
BACTERIOLOGICAL IDENTIFICATION SYSTEM
Lazar M. Schwartz, 660 Overlook Terrace,
New York, N.Y. 10040
Filed Sept. 24, 1970, Ser. No. 74,975
Int. Cl. B65b 3/04; B67d 5/00; B67c 3/00
U.S. Cl. 23—253 R
9 Claims

ABSTRACT OF THE DISCLOSURE

A plurality of test-tubes, containing samples to be tested, are surmounted by a circular distribution manifold and located in sockets provided in a baseplate. Individual transfer passages radiate from a central supply chamber in the manifold and terminate in orifices aimed at the open tops of the test-tubes. A reagent material is expelled from a flexible container, under the action of cam-operated clamp plates, into the central supply chamber of the manifold and distributed to the test-tubes through the radial passages.

BACKGROUND OF THE INVENTION

The present invention relates to novel apparatus for the performance of biological and chemical identification tests and reactions.

In many situations in the fields of chemistry, biochemistry, microbiology and industrial biology, there exists a requirement for the rapid performance of large number of parallel tests in which several samples of the same nature but differing origin are subjected to equal doses of a particular reagent and their behavior noted, or, alternately, the same test sample is subdivided into small doses and added to a number of previously identified reagents.

Such tests are performed in the detection and identification of micro-organisms in clinical laboratories, in quality testing of edible products, in the analysis of water samples for various types of pollution, in agricultural laboratories, in oceanography, in testing for bacteriostatic activity in the drug and textile industries, in the assay of vitamins and antibiotics, in determining the effectiveness of disinfectants and in almost all phases of analytical chemical laboratory practice.

As an example, hospital laboratories perform standardized tests for the identification of various micro-organisms in samples taken from a large number of patients every day.

All of these tests are characterized by the need for uniformity in handling the individual specimens and reagents, by the need for combining various tests in a set suited to a particular investigation, and by the necessity of eliminating excessive manual operations for reasons of both economy and reliability.

SUMMARY OF THE INVENTION

Accordingly, it is primary object of the invention to teach a construction of a device capable of performing such tests in the laboratory quickly, efficiently, and with precision.

It is a further object of the present invention, to describe details of construction for such a device which would adapt it to the practical needs of all users by permitting easy sterilization, operation under a wide range of ambient conditions, adaptability to standard laboratory equipment, and the definition of subsidiary components to make the device serve for all the manifold testing methods and conditions encountered in practice.

The bacteriological identification system constructed according to the principles of the invention comprises three basic elements: a rack capable of holding a number of similar containers, to hold the samples to be analyzed, a distribution manifold communicating with these containers, and a pump system to discharge equal and controlled doses of a reagent into each of the samples to be analyzed, through the manifold.

In the preferred embodiment, to be described in greater detail with reference to the drawing, the rack is adapted to hold standard laboratory test tubes of glass or plastic, serving as the containers, against discharge orifices arranged around the circumference of the circular manifold block. Within the manifold block radial passages, equal in length and flow area for hydraulic balance, connect each of the discharge orifices with a central supply chamber. This supply chamber, in turn, is connected to the discharge of a pump from which the reagent is expelled upon actuation of the appropriate controls.

In its simplest form, the pump is constructed as a small, deformable container of a flexible material, such as plastic, with an orifice closed by a suitable screw cap for charging its interior with the reagent fluid and a discharge nipple for attachment to the manifold block or to a flexible hose leading to the manifold block; the pumping action being supplied by a pair of clamp plates squeezing the pump chamber under the action of a cam rotated by an electric motor. The pump chamber may also be squeezed by hand if the amount of reagent to be pumped is relatively small and the exact quantity supplied is not critical.

Regardless of the manner of pumping the reagent to the manifold block, the latter will ensure the equal distribution to each sample container.

BRIEF DESCRIPTION OF THE DRAWING

FIG. 3 is a partial cross-sectional view along the line 3—3 of the assembly shown in FIG. 2;

FIG. 4 is a cross-sectional view along the line 4—4 of the sampler assembly shown in FIG. 2;

FIG. 5A illustrates the manner of mounting a hypodermic needle in the sampler assembly of FIG. 4;

FIG. 5B illustrates the use of the anaerobiotic adapter;

FIGS. 5C and 5D show the use and constructoin of an orifice plug;

FIGS. 6 and 7 are respectively side elevational and cross-sectional views (along line 7—7 of FIG. 6) of an alternate embodiment of the sampling tube;

FIGS. 8 and 9 are respectively perspective and cross-sectional views (along line 9—9 of FIG. 8) of another alternate embodiment of the sampling tube;

FIG. 10 is a transverse cross-sectional view through a sampling tube equipped with a spot-test device;

FIG. 11 is an exploded view of the elements or components of the spot-test device depicted in FIG. 10, and the sampling tube shown in FIG. 8;

FIG. 12 shows the spot-test assembly device with a test-tube adapter;

FIG. 13 is an exploded isometric view of a mini carbon dioxide supply which may be used in the practice of the invention;

FIG. 14 is a transverse cross-sectional view of an anaerobiosis cap for a sampling tube;

FIGS. 15, 15A, 15B, 15C and 15D show the anaerobiosis assembly and its component parts respectively;

FIGS. 16, 17A, 17B and 17C show the use and component parts of the contact submersible assembly respectively;

FIG. 18 is a sectional view through a strip holder disposed within a test tube; and FIG. 19 is a transverse sectional view along line 19—19 of the components shown in FIG. 18.

DESCRIPTION OF THE PREFERRED EMBODIMENTS

Figure 1:
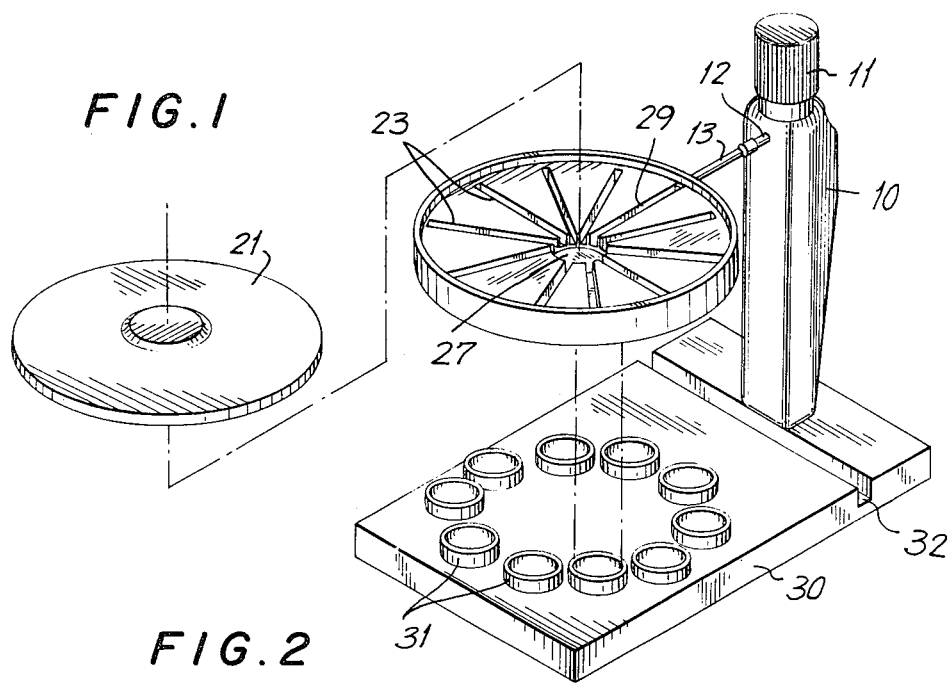
FIG. 1 is a partial exploded view in perspective of the major components of the preferred embodiment of the invention.

The preferred embodiment of the invention, shown in FIG. 1, is constructed around a baseplate 30, which serves as a rack for a plurality such as ten laboratory test tubes 39 through the provision of sockets 31, cylindrical in section and having hemi-spherical bases arranged around the circumference of a circle. A slot 32 is also provided in the base 30 for the retention of a stationary clamp-plate 51. A manifold block 20, referred to as the sampler, fits above the test tubes, which have been omitted from FIG. 1 for the sake of clarity, and is provided with radial distribution grooves 23 corresponding in number and spacing with the sockets 31. A further groove 29 in the sampler serves as the supply channel for the reagent ejected from a pump 10, referred to as the sampling tube, via a flexible connection 13. The connection 13 communicates with the sampling tube through a discharge nipple 12 integral with the sampling tube body. A tight-fitting cover 21 is provided for the sampler 20; when in place it converts the grooves 23 and the groove 29 into independent conduits communicating with the central chamber 27 in the sampler 20.

Figure 2:
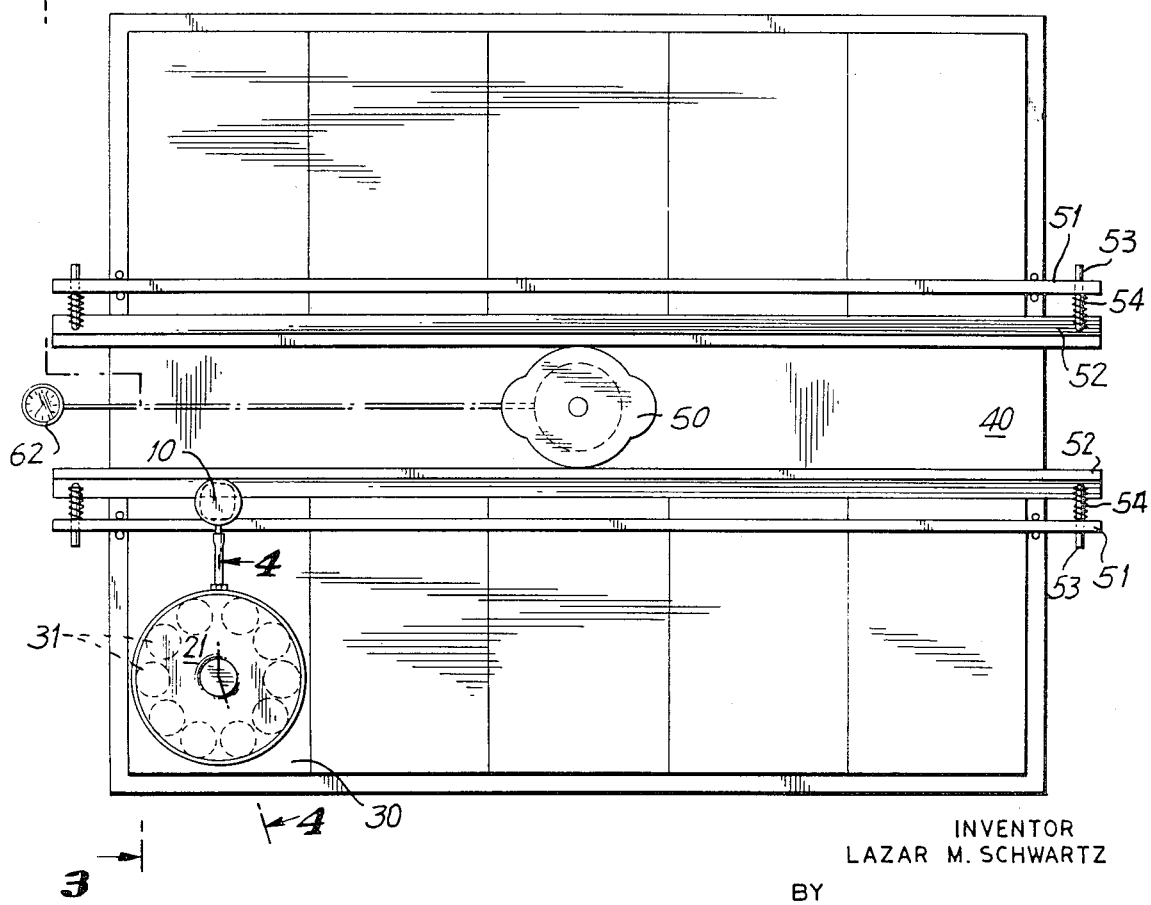
FIG. 2 is a plan view of a multiple testing assembly.

A number of bases 30, with corresponding sampler and sampling tube assemblies may be located in a common frame 40, as best shown in FIG. 2, and operated simultaneously by a common drive. In FIG. 2, the frame 40 can accommodate, for example, ten such sub-assemblies, five on either side of the centerline of the frame. The operating element of the drive is a symmetrical cam 50 bearing against movable clamp-plates 52 aligned by guide-pins 53 with respect to stationary clamp-plates 51. In operation, the rotation of the cam 50, in conjunction with the action of return springs 54, induces a cyclical reduction in the spacing between the stationary clamp-plates 51 and the movable clamp-plates 52 and, in consequence, imposes a cyclical volume change on the sampling tubes 10 located between the clamping elements. This volumetric change in the sampling tubes acts to expel some of the reagent contained in them through the discharge nipples 12.

The arrangement of these components is further illustrated in FIG. 3, a transverse section of the assembly of FIG. 2 along section line 3—3. A drive-motor 60 is suitably mounted centrally on the frame 40 with drive-shaft 61 in a vertical alignment; the cam 50 is rigidly affixed to the driveshaft 61 and bears against the movable clamp-plates 52.

The sampling tube 10 is provided with a filling orifice at its upper end, suitably closed by a screw-cap 11; its cross-section is substantially square in the upper third of the body, one side wall tapering inwardly below that. The tube is constructed from highly elastic material, such as polypropylene plastic, and is capable of accepting substantial deformations repeatedly without structural damage. The movable clamp-plates 52 have a wedge-shaped cross-section, the angle of the wedge corresponding to the taper of the sampling tube 10.

The sampling tube is filled with the appropriate reagent material in a readily pumpable form; liquid, slurry or fluidized powder. The motor 60 is energized through a timer control 62 and rotates for a pre-determined period, during which some of the reagent in the sampling tube 10 is expelled and enters the sampler assembly, being distributed to the individual test tubes 39 from the central chamber 27 of the sampler.

Where large quantities of the reagent have to be supplied, additional elements may be incorporated into the sampling tube drive. For example a ratchet device may be provided between the movable clamp-plates 52 and the cam 50 in such a manner that these plates move toward the corresponding stationary elements 51 but are prevented from returning to their original position when the cam-lobes have passed. This leads to a progressive reduction in the volume of the sampling tubes, the resulting pumping action being analogous to the squeezing out of the contents of a tooth-paste tube.

In a further elaboration of the device, the sampling tube operates as a positive displacement pump with a supply chamber for the reagent, a pump chamber reciprocated by the cam 50, and non-return valves connecting the supply chamber with the pump chamber and the latter with the discharge nipple 12.

These alternative embodiments do not in any way alter the function of the reagent supply system of the present invention, in that a cam drives a deformable pump element to discharge reagent into the sampler in a volumetric quality which is a function of the operating time of the drive motor 60, as preset by the timer 62.

FIG. 4 is a detailed, cross-sectional view of the sampler assembly, showing discharge orifices 24 opening from the the distribution grooves 23, entrance orifices 22 into the same from the central chamber 27 and a supply nipple 19 which interconnects the flexible supply hose 13 with the supply groove 29. Bosses 25 center on the discharge orifices 24 and are adapted to receive hypodermic needles. Retaining sockets 26 are centered on the bosses 25 and co-operate with the sockets 31 in the base 30 in locating the test tubes 39, in which the materials to be tested or assayed are loaded, relative the other elements of the identification system.

In an alternative embodiment of the sampler, the central supply chamber 27 is arranged to be at a lower elevation than the discharge orifices 24, the distribution grooves 23 sloping upward towards the latter. Such an arrangement is advantageous where extreme precision in metering the reagent from the sampler is required, in that it eliminates the possible dribbling of reagent from the central chamber under gravitational forces after pumping from the sampling tube has been discontinued.

The method of mounting a hypodermic needle 28 over the boss 25 is shown in FIG. 5A. The provision of such a needle allows the alternative method of transferring the reagent from the sampler into the test-tube near the bottom of the latter, should the mixing turbulence induced by the reagent impacting on the surface of the test material be objectionable or the supply of the reagent from the bottom of the test material be desirable for some other reason.

To facilitate the use of the bacteriological identification system of the invention, a number of accessory devices may be furnished. An anaerobiotic adapter 45, illustrated in FIG. 5B, is one of these. In testing procedures where the ambient atmosphere must be rigidly excluded from the reaction space in the test-tube 39, the adapter 45 forms a plug in the upper bore of the test-tube and is provided with an axial orifice 145 and a depression 245 adapted to seal against the boss 25 subtending from the sampler 20.

In FIGS. 5C and 5D, a plug 46 is shown. This accessory is used when a test is performed using less than the full complement of test-tubes for a given base 30; to prevent loss of the reagent from the unutilized test position. The plug 46 is equipped with a socket 146 forming a mating surface for the boss 25, to seal the orifice 24, and is inserted into retaining socket 26.

An alternative embodiment of the sampling tube is illustrated in FIG. 6 in side-view and in FIG. 7 in cross-section. An enclosed container 110 is formed by two opposing flat walls connected by pleated side elements 116 and similarly corrugated bottom closures 216. A charging orifice, closed by screw-cap 111, is provided at the top of the sampling tube 110 and a discharge nipple 112 is attached to one of the flat walls. An additional discharge nipple 112a may be utilized as a supply port, nipple 112 being the discharge port, in conjunction with appropriate non-return valves when the sampling tube 110 is used as a pump chamber between a reagent container and the sampler assembly.

Yet another embodiment of the sampling tube, a container 210, is shown in FIGS. 8 and 9 with a substantially rectangular cross-section. Changes in the volumetric capacity of the tube 210 are effected by compressing a substantially ellipsoidal bulge 217 formed in one of its walls. Nipples 212 and, optionally, 212a serve the same functions as analogous elements 112 and 112a in the sampling tube 110.

Another accessory provided for the microbiological identification system is the anaerobiosis assembly illustrated in FIGS. 15, 15A, 15B, 15C and 15D. This device removes oxygen, introduced from the atmosphere, from the test-tubes 39, the sampling tube 10 and from the various passages interconnecting the two; a procedure which may be required for particular microbiological tests. In most laboratories, oxygen is removed by devices employing platinum catalysts. In the System of the present invention a simpler reaction involving iron, provided in the form of steel wool, and copper sulphate is utilized.

The copper sulphate, in liquid form, is charged into a substantially cylindrical container 70 open at the top, shown in FIG. 15B. The bottom of the container 70 carries a hollow boss 73, also cylindrical in form but open at the bottom, whose side-wall is pierced by an orifice 75 and whose internal surface carries a groove 74 forming a tight seal when engaged by a mating seal-ring 77. The outer wall of the container 70 carries a seal-ring 72 near its upper edge which may be engaged by a mating groove in a cap 71, shown in FIG. 15A, which, together with the container 70 forms the first-step donor assembly. The anaerobiosis assembly is completed by a second-step receiver, comprising a receiver chamber 76 and a base 78.

The receiver chamber 76 is illustrated in FIG. 15C and takes the shape of three concentric, interconnected cylinders, the largest of which is open at the bottom, the intermediate one open at the top and the smallest open at the bottom again. The base 78, a cylindrical vessel open at the top, is a sliding fit in the outermost cylinder of the receiver chamber and is sealed by means of a snap-action ring and groove seal, a seal-ring being provided on the outer surface of the base 78 and its mating groove machined into the inner surface of the receiver chamber near its lower end. The base 78 is illustrated in FIGS. 15 and 15D and same is suitably sealed when assembled to the receiver chamber 76 by means of a seal-ring 79, as is well known in the art.

The smallest and intermediate diameter cylinders of the receiver 76 are provided with outer and inner diameters corresponding to the respective inner and outer diameters of the hollow boss 73 and the container 70, a seal-ring 77 on the outer surface of the smallest cylinder mating with and engaging the groove 74 upon assembly of these two parts. An orifice 82 is provided in the wall of the innermost cylinder of the receiver 76 in such a position that upon appropriate angular alignment it communicates with the orifice 75 in the boss 73 and, in conjunction with the latter, forms a valve opened and closed by rotating the container 70 with respect to the receiver 76.

These four parts are shown assembled in FIG. 15. In operation, steel wool is packed into the base 78 and the latter inserted into the receiver 76; the container 70 is then added to the assembly with the orifices 75 and 82 in the "off," or non-communicating, position and copper sulphate poured into the container and the cap 71 snapped into position. A nipple 80 is provided, communicating with the enclosed volume of the receiver 76 and is connected by means of a flexible hose to the space from which oxygen is to be removed. This connection may be made, for example, to nipple 112a in a sampling tube 110. The container is then rotated to bring the orifices 75 and 82 into radial alignment, permitting the copper sulphate solution to flow, by gravity, into the base 78 and the oxygen consuming reaction between the solution and the iron in the steel wool to begin.

With the anaerobiosis assembly in operation, the introduction of an inert gas, such as carbon dioxide, is beneficial for the growth of some micro-organisms an a suitable device for performing this function (the mini carbon dioxide supply) is illustrated in FIG. 13.

The carbon dioxide supply assembly includes a pan 92, provided with a male seal-ring 93 seated in a suitable groove; the mating female groove is machined into the inner surface of a cap 94 provided with a nipple 95 to which a flexible conduit 96 may be attached. The pan 92 is filled with a source liberating carbon dioxide, such as granulate sodium bicarbonate, and closed with the cap 94 and the conduit 96 is attached to a suitable nipple of a sampling tube, e.g. 112a, in the sampler tube of the identification system.

In instances where several accessories are to attached to a given sampler tube 10, or one of the alternate embodiments of this component, the number of connection nipples required may exceed those integrally provided. FIG. 14 illustrates an anaerobiosis cap 97 which replaces the cap 11, or its analogues, and which has integral nipple 98 and 99 to which flexible conduits 198 and 199 may be attached respectively. Such a cap 97 may be used, for example, in conjunction with the anaerobiosis assembly and the carbon dioxide supply, in which case conduits 81 and 96 replace the conduits 198 and 199 respectively.

Another accessory, a contact submersible assembly, is illustrated in FIG. 16, 17A, 17B, and 17C. The purpose of this assembly is to permit testing of bacterial contamination of substances immiscible with the fluid medium present in the sampling tube 10 or test-tube 39 (examples: soil, solid foods, oils, etc.). Filter paper, or some other porous membrane, is provided as a suitable barrier between the test substance and the fluid medium, the micro-organisms and reaction products passing freely through its pores.

FIG. 17A illustrates an inner cage 85 formed by two rings interconnected by a number of axially aligned bars, four in the illustrated embodiment. A sheet 86 of the membrane used is wrapped around this inner cage 85, as shown in FIG. 17B, and the subassembly inserted into an outer cage 83, similarly constructed to the inner cage 85 but larger in diameter so that the membrane 86 is snugly retained in the assembly, as shown in FIG. 17C. A bottom cap 84, forming a tight seal in cooperation with the lower ring of the outer cage completes the contact submersible assembly. The test substance is placed under sterile conditions into the assembly through its upper end and the assembly is slid into the sampling tube 10 on a test-tube 39 for testing.

A small piece of filter paper, or other membrane, pre-impregnated with a particular reagent may be used to detect the presence of an unknown substance by a reaction inducing a change of color or other detectable characteristic on the pre-impregnated surface. Means for performing such a "spot-test" are illustrated in FIGS. 10, 11 and 12.

The spot-test assembly consists of a strip-holder 87 and a cap 89 provided with mating threaded surfaces and clamping ridges 187 and 189 respectively, between which a spot-test strip 88 may be clamped. In FIG. 10 such an assembly is shown attached to a nipple 312a of a substantially cylindrical sampler tube 310 having a cap 311, by means of a cylindrical extension 91 integral with the strip-holder 87 which is a snug fit over the nipple. FIG. 11 shows the same components in an exploded view, while FIG. 12 shows the spot-test assembly applied to a test-tube 39 by means of an adapter 90. The adapter 90 is a cylindrical body with an open end whose internal diameter corresponds to the outer diameter of the test-tube 39 and whose closed end is provided with a nipple fitting into extension 91.

A strip-holder insert is represented in FIGS. 18 and 19 and simply comprises a spot test strip in the form of a disk, like that represented by reference numeral 88, disposed atop a strip-holder which is slideably filled within the test-tube itself in contrast to the construction of the spot-test assembly.

While the invention has been described, disclosed, illustrated and shown in terms of embodiments or modifications which it has assumed in practice, the scope of the invention should not be deemed to be limited by the precise embodiments or modifications herein described, disclosed, illustrated or shown, such other embodiments or modifications as may be suggested to those having the benefit of the teachings herein being intended to be reserved especially as they fall within the scope and breadth of the claims here appended.

What is claimed is:

1. A bacteriological identification system comprising a frame, rack means, a multiplicity of reaction vessels adapted to be located in said rack means, each containing a fluid and a sample of a material to be tested; first clamp means, rigidly affixed to said frame; second clamp means reciprocably located in said frame; reagent container of elastic material located between said first and second clamp means; conduit means communicating with said reagent container; drive means, including cam, for entrainment of second clamp means toward said first clamp means, whereby said reagent container is compressed and its contents forced into said conduit means; and manifold means communicating with said conduit means for distributing reagent expelled from said container in equal amounts into said reaction vessels, whereby biochemical reaction with said samples contained in said reaction vessels and contents of said reagent container is initiated.

2. The bacteriological identification system according to claim 1, further comprising means for the removal of oxygen from internal spaces of said reagent container, said reaction vessels and interconnecting passages, including said manifold means and said conduit means; and means for supplying carbon dioxide or a like gas to replace oxygen removed by said oxygen removal means.

3. The bacteriological identification system according to claim 1, wherein said manifold means includes a horizontally aligned circular disk with a radial supply channel connecting one point on the periphery of said disk with a central chamber from which a plurality of radial passages convey reagent from said reagent container, introduced into said central chamber through said radial supply channel, to discharge orifices near the periphery of said disk; each of said discharge orifices being in communication with one of said reaction vessels and one of said radial passages for the distribution of reagent pumped from said reagent container.

4. The bacteriological identification system according to claim 1, wherein said rack means include a substantially rectangular block provided with sockets, cylindrical in section with hemi-spherical bases, for the support of said reaction vessels in a substantially vertical alignment.

5. The bacteriological identification system according to claim 1, wherein said drive means include motor means with rotatable shaft; said cam being rigidly affixed to said shaft; and timer means for controlling duration of operation of said motor and thereby control quantity of reagent expelled from said reagent container into said manifold means.

6. The bacteriological identification system according to claim 1, wherein said second clamp means include ratchet means, whereby reciprocal motion imparted by said cam to said ratchet means is transmitted to a second clamp-plate only in direction of closure with said first clamp means, thereby progressively reducing volume of said reagent container during operation of said drive means.

7. In combination with the bacteriological identification system according to claim 1, a contact submersible assembly for evaluation of microbial contamination of substances or materials inmiscible with or insoluble in said fluid in said reaction vessel, said contact submersible assembly comprising inner cage means, outer cage means, and a porous membrane disposed between said cage means.

8. In combination with the bacteriological identification system according to claim 1, a spot test assembly for identification of products of reaction comprising holder means adapted to support a porous membrane, and cap means for closing said assembly, said holder means having aperture means for permitting the reagent to be transferred into said spot test assembly.

9. In combination with the bacteriological identification system according to claim 1, a strip holder insert assembly for identification of products of reaction comprising holder means adapted to be seated at the botom of a test tube and having means to retain a porous membrane at the upper portion or end of said holder means.

References Cited
UNITED STATES PATENTS

| | | | |
|---|---|---|---|
| 2,361,647 | 10/1944 | Nyden | 222—215 |
| 2,800,930 | 7/1957 | Recope | 141—238 |
| 3,437,447 | 4/1969 | Harmon | 23—253 R |

MORRIS O. WOLK, Primary Examiner

R. M. REESE, Assistant Examiner

U.S. Cl. X.R.

137—262; 141—239; 222—136, 214; 195—103.5, 127